(12) United States Patent
Eom

(10) Patent No.: US 7,046,598 B2
(45) Date of Patent: May 16, 2006

(54) APPARATUS FOR AND METHOD OF DETECTING PHASE DIFFERENCE BETWEEN PHASE REFERENCE SIGNAL AND WOBBLE

(75) Inventor: Woo-sik Eom, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 381 days.

(21) Appl. No.: 10/369,522

(22) Filed: Feb. 21, 2003

(65) Prior Publication Data
US 2003/0161234 A1   Aug. 28, 2003

(30) Foreign Application Priority Data
Feb. 23, 2002   (KR) ................... 2002-9743

(51) Int. Cl.
*G11B 5/09* (2006.01)
(52) U.S. Cl. ............... 369/47.48; 369/59.19; 369/44.13; 369/59.1
(58) Field of Classification Search ............ 369/44.13, 369/44.34, 47.1, 47.22, 47.36, 47.48, 47.28, 369/53.1, 53.44, 59.1, 59.19, 59.2, 59.25, 369/275.1, 275.4
See application file for complete search history.

(56) References Cited

U.S. PATENT DOCUMENTS 6,570,831 B1 * 5/2003 Choi ................ 369/47.28

FOREIGN PATENT DOCUMENTS

JP        10-293926      11/1998

OTHER PUBLICATIONS

Korean Office Action issued Oct. 28, 2004 in corresponding Korean Patent Application.

* cited by examiner

*Primary Examiner*—Muhammad Edun
(74) *Attorney, Agent, or Firm*—Staas & Halsey LLP

(57) ABSTRACT

An apparatus which records/reproduces data with respect to an optical recording medium, includes a data processing unit which detects a phase difference between a phase reference signal and a groove wobble signal detected from the optical recording medium, and compensates for the phase difference and performs a signal processing to record data on or reproduce data from the optical recording medium in response to the phase difference being equal to or greater than a predetermined reference value. By detecting a phase difference between a phase reference signal and a wobble signal and compensating for the phase difference, a recording of data on and a reproducing of data from the optical recording medium can be more accurately performed.

16 Claims, 3 Drawing Sheets

APPARATUS FOR AND METHOD OF DETECTING PHASE DIFFERENCE BETWEEN PHASE REFERENCE SIGNAL AND WOBBLE

CROSS-REFERENCE TO RELATED APPLICATIONS

This application claims the benefit from Korean Patent Application No. 2002-9743, filed Feb. 23, 2002, the disclosure of which is incorporated herein by reference.

BACKGROUND OF THE INVENTION

1. Field of the Invention

The present invention relates to recording data on an optical recording medium, and more particularly, to a method of detecting a phase difference between an address information signal and a wobble signal of an optical recording medium, and controlling a correction of the obtained phase difference.

2. Description of the Related Art

Generally, optical recording media such as a DVD-R and a DVD-RW have land pre-pits (LPPs) which are formed by providing pits having address information on a land during a manufacturing thereof. An LPP signal is read where a light beam follows a track of an optical recording medium. The LPP signal is measured by an optical pickup of a recording apparatus before and after a recording.

A groove wobble is also read where a light beam follows a track, and is measured by an optical pickup of a recording apparatus before and after a recording.

Where a groove wobble signal is a sine wave signal, the groove wobble signal and an LPP signal are formed on a disc such that the two signals have a phase difference of 90±10°. The difference between the groove wobble signal and the LPP signal is measured between the highest point of the LPP signal and the average zero crossing point of the groove wobble signal. This phase difference should be maintained so that the LPP signal can be correctly decoded and data can be recorded on accurate locations on the optical recording medium.

Where a wobble signal and an LPP signal are detected, the characteristic of a detection filter itself increases the phase difference such that an accurate phase difference between the wobble signal and LPP signal cannot be obtained.

In the optical recording media such as a DVD-R and a DVD-RW, address information is engraved on the disc by using phase information of a wobble signal. Where the wobble signal is detected and compared with a phase reference signal, a wobble phase error generated by the characteristic of a detection filter itself should be corrected so as to record data on accurate locations on the optical recording medium.

SUMMARY OF THE INVENTION

Accordingly, it is an aspect of the present invention to provide an apparatus and a method of accurately detecting a phase difference between a phase reference signal and a wobble signal on an optical recording medium so as to correctly perform a recording of data on and a reproducing of the data from the optical recording medium.

Additional aspects and advantages of the invention will be set forth in part in the description which follows and, in part, will be obvious from the description, or may be learned by practice of the invention.

To achieve the above and/or other aspects of the present invention, there is provided an apparatus which records and reads data with respect to an optical recording medium, comprising a data processing unit which detects a phase difference between a phase reference signal and a wobble signal detected from the optical recording medium, and in response to the phase difference being equal to or greater than a predetermined reference value, compensates for the detected phase difference and performs a signal processing to record the data on or reproduce the data from the optical recording medium.

To achieve the above and/or other aspects of the present invention, there is provided an apparatus which detects a phase difference between a phase reference signal and a wobble signal detected from an optical recording medium, comprising a wobble PLL unit which outputs a wobble clock signal, which is the result of a phase-locked loop circuit having the wobble signal as an input signal, and a PLL wobble signal which is phase-synchronized to the input wobble signal, a center detection unit which detects a center of the phase reference signal and generates a center detection signal, a count hold signal generation unit which generates a count hold signal at a rising edge of the PLL wobble signal that is first generated after the center detection signal of the center detection unit, a counter which sets a cycle of the phase reference signal from the center detection signal, and down-counts in units of wobble clocks to a point where the count hold signal is generated, and a count latch unit which uses the count hold signal, latches a count value counted in the counter and maintains the counted value until a next hold signal is generated so as to calculate the phase difference between the wobble signal that is to be actually compensated and the phase reference signal.

In the apparatus, the center detection unit may detect a rising edge of 1T of the phase reference signal, and delays the detected value for 2 to 3Ts so as to output the center detection signal of the phase reference signal.

In the apparatus, a signal obtained by frequency-dividing the PLL wobble signal is provided as an interrupt signal to a predetermined control unit so that the phase difference is read by the predetermined control unit.

To achieve the above and/or other aspects of the present invention, there is provided a method of recording/reproducing data with respect to an optical recording medium, the method comprising detecting a phase difference between a phase reference signal and a wobble signal detected from the optical recording medium, and compensating for the phase difference where the phase difference is equal to or greater than a predetermined reference value.

To achieve the above and/or other aspects of the present invention, there is provided a method of detecting a phase difference between a phase reference signal and a wobble signal where data is recorded on and reproduced from an optical recording medium, the method comprising outputting a wobble clock signal which is the result of a phase-locked loop circuit having the wobble signal as an input signal, and a PLL wobble signal which is phase-synchronized to the wobble signal, detecting a center of the phase reference signal and generating a center detection signal, generating a count hold signal at a first rising edge of the PLL wobble signal that is first generated after the center detection signal of the phase reference signal, setting a cycle of the phase reference signal from the center detection signal, and down-counting in units of wobble clocks to a point where the count hold signal is generated, and by using the count hold signal, latching the counted value and maintaining the counted value until a next hold signal is generated so as to output the counted value as the phase difference between the phase reference signal and the wobble signal.

The optical recording medium may be one of a DVD-R and a DVD-RW, and the phase reference signal may be a land pre-pit (LPP) signal. In the method, the detecting of the center of the phase reference signal may include detecting a rising edge of 1T of the LPP signal and delaying the detected value for 2~3Ts so as to output a center detection signal of the LPP signal.

BRIEF DESCRIPTION OF THE DRAWINGS

These and/or other aspects and advantages of the present invention will become apparent and more readily appreciated from the following description of the embodiments, taken in conjunction with the accompanying drawings of which:

FIGS. 4A–4F are timing diagrams of signals which are output from components shown in FIG. 2.

DETAILED DESCRIPTION OF THE EMBODIMENTS

Figure 1:
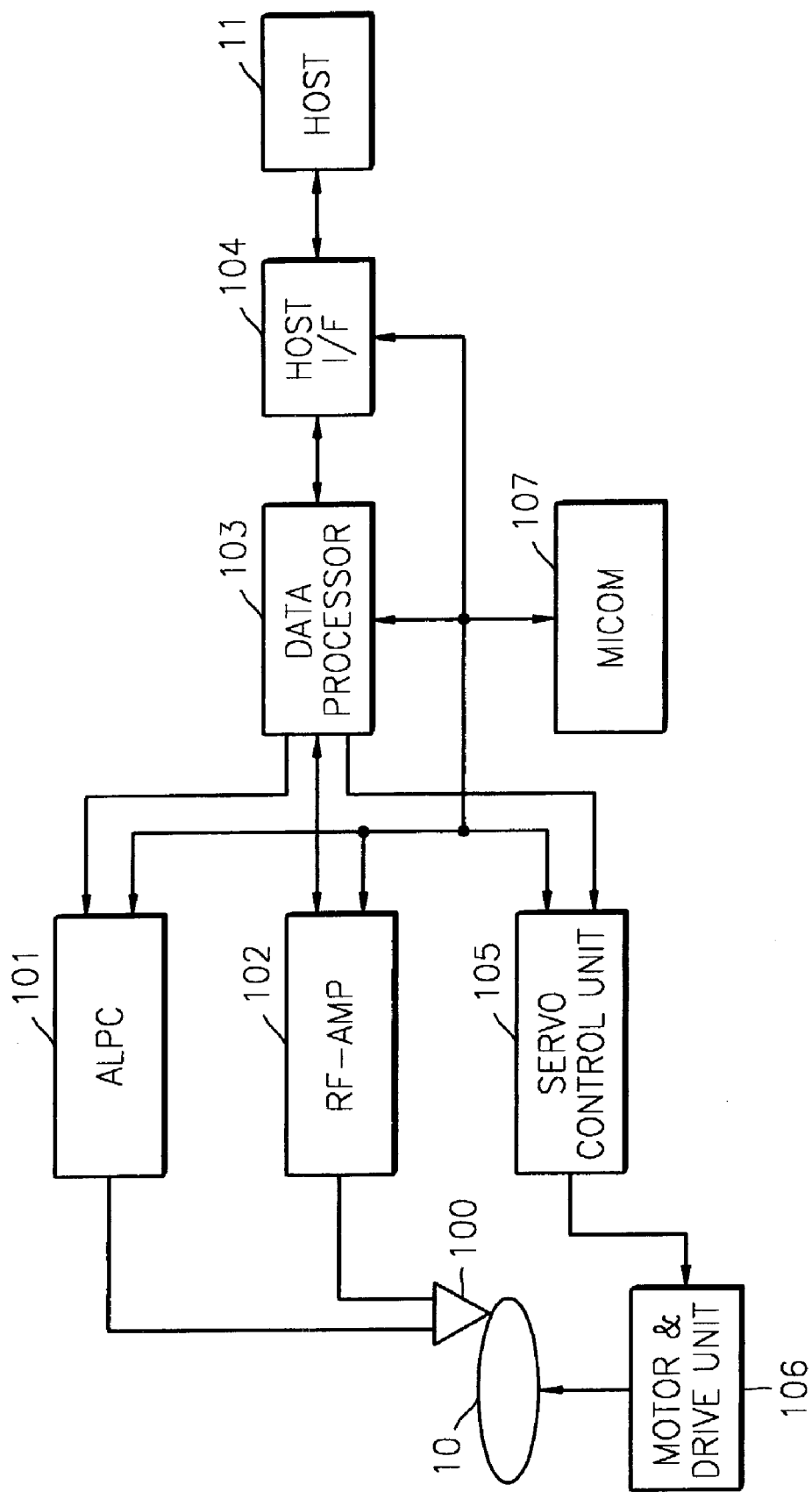
FIG. 1 is a block diagram illustrating an apparatus which records and reproduces data with respect to an optical recording medium, according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 shows an apparatus which records data on and reproduces data from an optical recording medium 10, according to an embodiment of the present invention. The apparatus comprises a pickup unit 100, an adaptive laser power controller (ALPC) 101, a high frequency amplifier (RF-AMP) 102, a data processor 103, a host interface unit 104, a servo control unit 105 and a motor & drive unit 106.

The pickup unit 100 reads a signal recorded on the optical recording medium 10.

The ALPC 101 receives a recording pulse signal and a write clock signal from the data processor 103 and controls the amount of laser light to record data. Accordingly, the recording pulse signal is made to be recorded in a form of a recording mark on the optical recording medium 10 through the pickup unit 100 according to the write clock signal.

The RF-AMP 102 amplifies a minute electrical signal output from the pickup unit 100. A reproduction signal and a wobble signal are detected from the amplified electrical signal and are provided to the data processor 103.

Where data is reproduced, using the reproduction signal provided by the RF-AMP 102, the data processor 103 detects a synchronization signal, and performs insertion and protection processing, a demodulation, and an error detection and correction. Also, the data processor 103 generates a variety of control signals for the RF-AMP 102 and provides signals related to a servo to the servo control unit 105. Where the data is recorded, the data processor 103 performs a modulation and an error-correction-encoding of the data provided by the host 11 through the host interface unit 104, generates a corresponding recording pulse signal, and provides the signal to the ALPC 101. In this embodiment, the data processor 103 comprises a circuit (not shown) which detects a phase difference between a wobble signal and a phase reference signal (for example, an LPP signal in a DVD-R and DVD-RW) and compensates for the difference (see further details and/or the embodiment with reference to FIG. 2 below).

The host interface unit 104 interfaces between the data processor 103 of the optical recording/reproducing apparatus and the host 11.

The servo control unit 105 receives the signal related to a servo provided by the data processor 103 and performs a motor control in relation to a rotation speed control of the optical recording medium 10 and a servo control, such as a tracking control and a focus control.

The motor & drive unit 106 comprises a motor (not shown) to rotate the optical recording medium 10 and a drive unit (not shown). The motor & drive unit 106 controls the motor and the drive unit according to a motor driving signal or a servo driving signal provided by the servo control unit 105 to tack or focus a servo.

The apparatus which records/reproduces data on/from the optical recording medium 10 further comprises a microcomputer (micom) 107 which controls each element of the apparatus shown in FIG. 1 and signal flows between the elements. However, it is understood that other types of controllers could be used.

Figure 2:
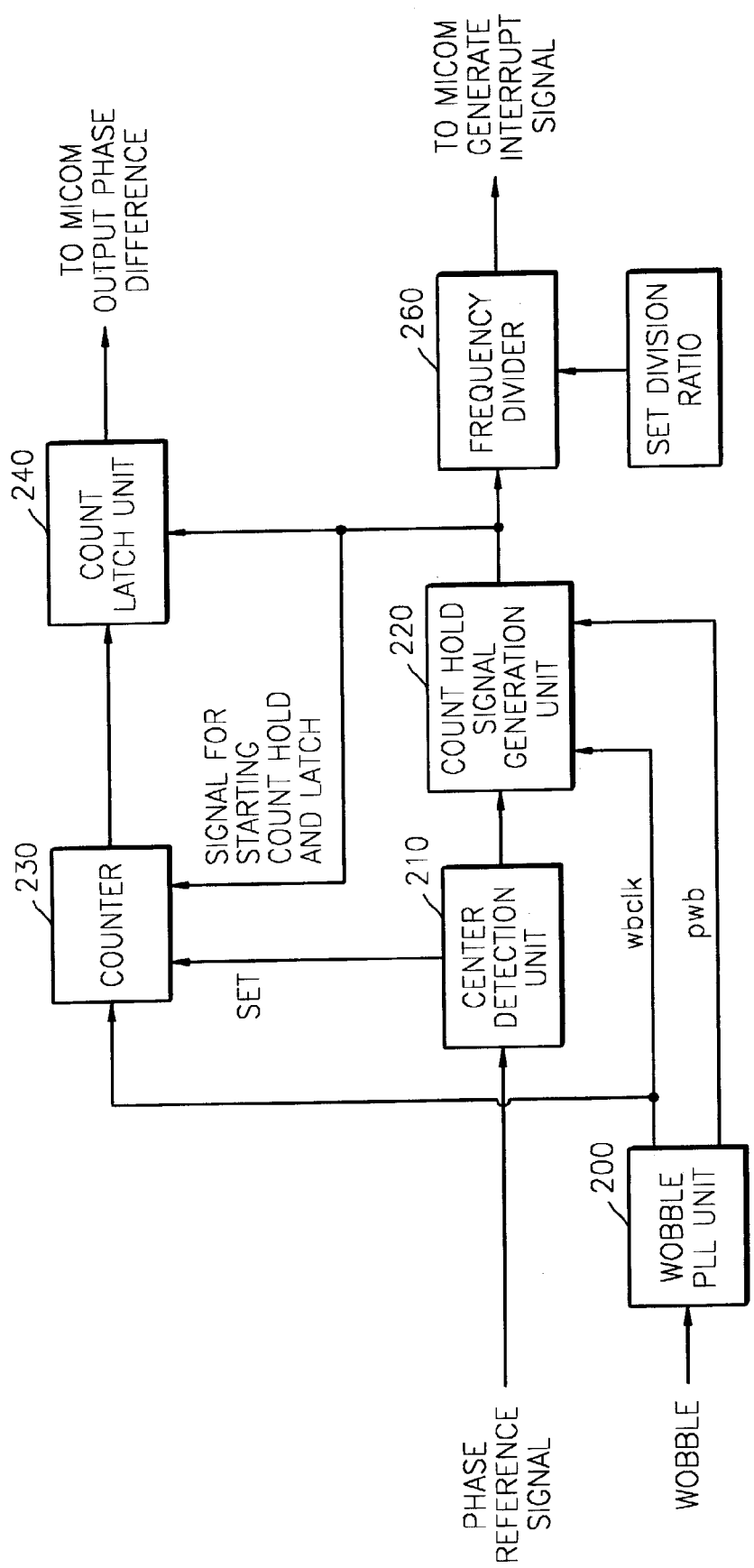
FIG. 2 is a block diagram illustrating an apparatus which detects a phase difference between a phase reference signal and a wobble signal according to another embodiment of the present invention.

FIG. 2 shows a block diagram of an apparatus which detects a phase difference between a phase reference signal and a groove wobble signal, according to another embodiment of the present invention.

The apparatus which detects the phase difference between the phase reference signal and the groove wobble signal (hereinafter referred to as 'a wobble signal') comprises a wobble PLL unit 200, a center detection unit 210, a count hold signal generation unit 220, a counter 230, a count latch unit 240, and a frequency divider 260.

The wobble PLL unit 200 outputs a wobble clock signal (wbclk) which is the result of a phase-locked loop circuit having the wobble signal as an input signal, and a PLL wobble signal (pwb) which is phase-synchronized to the input wobble signal.

Figure 3:
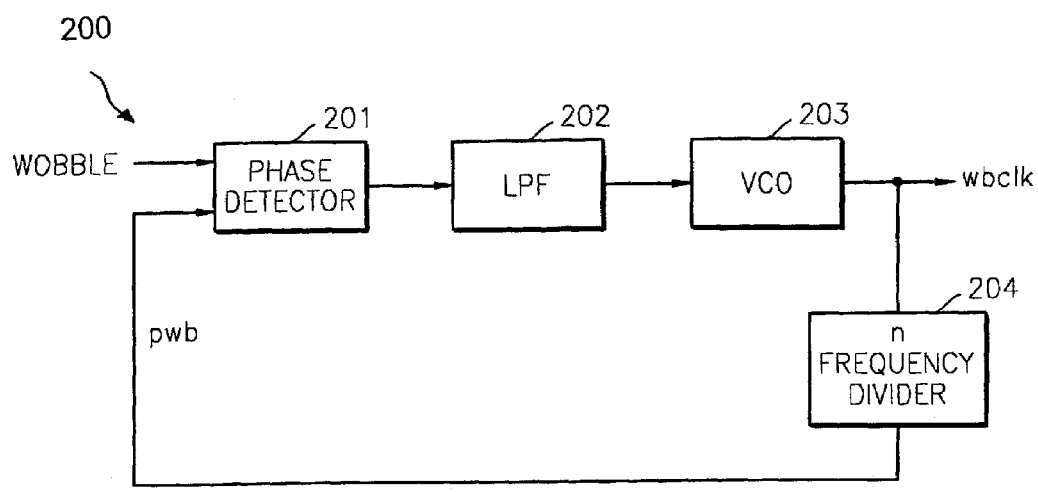
FIG. 3 is a block diagram illustrating a wobble PLL unit of FIG. 2.
Figure 3:
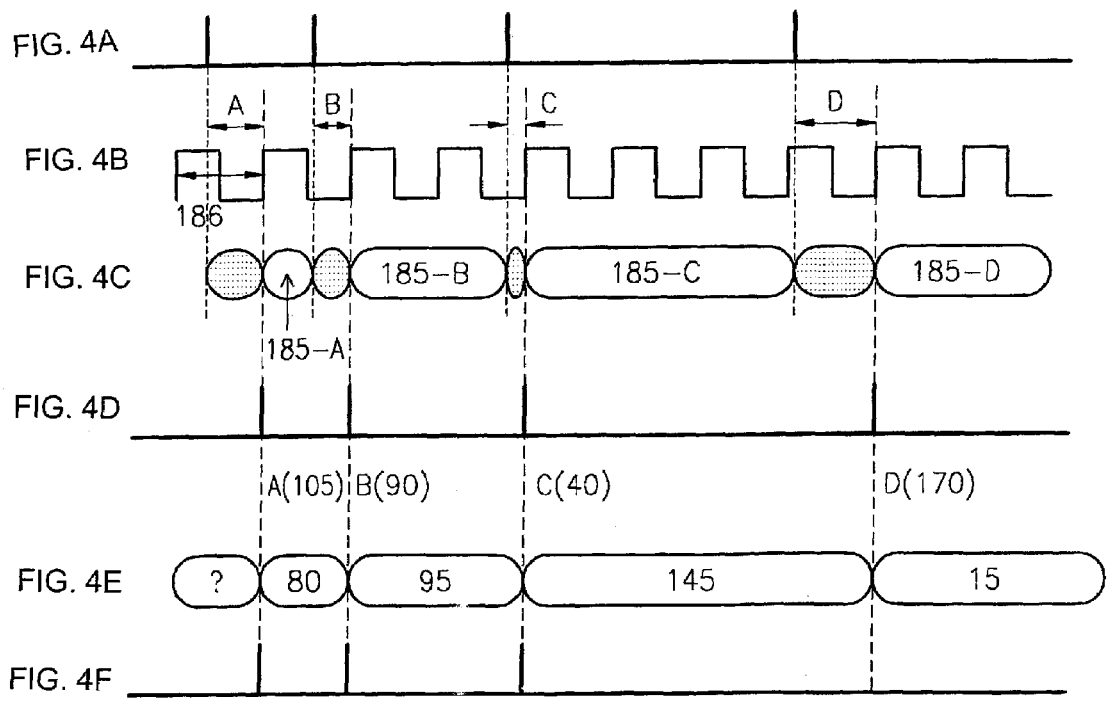

FIG. 3 shows a block diagram of the wobble PLL unit 200 of FIG. 2. As shown in FIG. 3, the wobble PLL unit 200 comprises a phase detector 201 which outputs a phase difference by comparing a wobble signal with a PLL wobble signal (pwb) that is an n-frequency-divided signal of a wobble clock signal (wbclk) phase-synchronized to the wobble signal, a low pass filter (LPF) 202 which low pass filters the phase difference signal provided from the phase detector 201, a voltage-controlled oscillator (VCO) 203 which outputs a clock oscillation signal corresponding to a voltage output from the low pass filter (LPF) 202, and an n-frequency divider 204 which generates the PLL wobble signal (pwb) by n-frequency dividing the wobble clock signal (wbclk) output from the voltage-controlled oscillator (VCO) 203. The PLL wobble signal (pwb) has a proper frequency and phase that the original wobble signal has.

Referring back to FIG. 2, the center detection unit 210 detects the center of the phase reference signal. In a DVD-R and DVD-RW, an LPP signal, that is a phase reference signal, may have a pulse width of 5~6T (1T is 1 channel clock cycle). By detecting a rising edge of 1T of this LPP signal and delaying it for 2~3Ts, a center detection signal of the LPP is output.

The count hold signal generation unit 220 generates a count hold signal at the rising edge of the PLL wobble signal (pwb) which is generated for the first time after the center detection signal of the center detection unit 210.

The counter 230 sets a cycle of the phase reference signal from the center detection signal, and down-counts in units of wobble clocks (wbclk) to a point where the count hold signal is generated.

Using the count hold signal generated in the count hold signal generation unit 220, the count latch unit 240 holds a count value counted in the counter 230, and maintains the count value until a next hold signal is generated so as to calculate a phase difference of the wobble signal that should be actually compensated.

The frequency divider 260 provides the micom 107 with a signal to read the phase reference output from the count latch unit 240. A latch signal generated in the count hold signal generation unit 220 has, for example, a minimum width of 1 pwb cycle, and the cycle of a normal pwb signal is shorter than a processing cycle of the micom 107. Accordingly, the frequency divider 260 appropriately frequency divides the latch signal and outputs a signal that can be processed in the micom 107. Since the output of the frequency divider 260 is to indicate the micom 107 to read the output signal of the count latch unit 240, where the micom 107, for itself, reads a phase difference that is the output of the count latch unit 240, in a polling method, the output of the frequency divider 260 is not necessarily needed.

FIGS. 4A–4F are timing diagrams of signals which are output from elements/components shown in FIG. 2.

FIG. 4A shows an example of a center detection signal which is output from the center detection unit 210 of FIG. 2. This corresponds to a center detection signal of a LPP signal that is a phase reference signal in the examples of a DVD-R and DVD-RW.

FIG. 4B shows an example of a PLL wobble signal (pwb) which has the same phase and frequency as a wobble signal on the optical recording medium 10 and is output from the wobble PLL unit 200.

FIG. 4C shows a timing diagram of an output value of the counter 230. To a rising edge of a PLL wobble signal (pwb) that is generated for the first time after an LPP center detection signal is generated, the counter 230 down-counts in units of wobble clocks (wbclk), and the count value is held by a hold signal. The held values are shown as 185-A, 185-B, 185-C, and 185-D. In a DVD-R and a DVD-RW, 1 wobble cycle is, for example, 186 wobble clocks (wbclk).

FIG. 4D shows the output result of the hold signal generation unit 220. A hold signal at a rising edge of a PLL wobble signal (pwb), which is generated for the first time after a center detection signal of the center detection unit 210, is output from the hold generation unit 220.

FIG. 4E shows the output values of the count latch unit 240 and the output values which are counted by the counter 230 that are latched by a hold signal generated by the hold signal generation unit 220. The output values correspond to respective phase differences to be compensated for where A=105, B=90, C=40, and D=170. That is, the phase difference between an LPP signal and a wobble signal is the difference between a rising edge of the LPP signal and a rising edge of the PLL wobble signal (pwb). In the embodiment of FIG. 4, the count latch outputs are 185-A, 185-B, 185-C, and 185-D, respectively. Where 1 wobble signal cycle is 186 wobble clocks (wbclk) in a DVD-R and a DVD-RW, a count value is in a range from 0 to 185. Accordingly, in the embodiment of FIG. 4, where A=105, B=90, C=40, and D=170, the generated phase differences between LPP signals and groove wobble signals are 185−105=80, 185−90=95, 185−40=145, and 185−170=15, respectively.

FIG. 4F shows an interrupt signal which is provided to the micom 107 so that the micom 107 can read a phase difference signal of an LPP signal (a phase reference signal) and a wobble signal, and use the phase difference signal to perform predetermined control processes related to a recording and reproducing of data. For example, 1 wobble cycle in a DVD-R and a DVD-RW is 186 wobble clocks (wbclk), or about 7.11 µsec. Since the micom 107 may not process an interrupt signal where the interrupt occurs at this wobble cycle, it is needed to appropriately frequency divide a wobble frequency. FIG. 4F shows an output value obtained by ½-frequency dividing a PLL wobble signal (pwb). The interrupt signal shown in FIG. 4F is not necessarily needed by the micom 107 that reads a phase difference value, as shown in FIG. 4E. That is, where the micom 107 is programmed in itself to read a phase difference value at each predetermined time cycle in a polling method, the interrupt signal as shown in FIG. 4F may not be needed.

As described above, by providing an apparatus and a method of detecting a phase difference between a phase difference signal and a groove wobble signal, a phase difference greater than a predetermined reference value can be compensated for. Accordingly, using a phase reference signal and a wobble signal, recording data on and reproducing data from an optical recording medium can be performed more accurately.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An apparatus which records and reproduces data with respect to an optical recording medium, comprising a data processing unit which detects a phase difference between a phase reference signal and a wobble signal detected from the optical recording medium, and in response to the detected phase difference being equal to or greater than a predetermined reference value, compensates for the phase difference and performs signal processing to record the data on or reproduce the data from the optical recording medium, wherein the phase difference between the phase reference signal and the wobble signal is a difference between a rising edge of a PLL wobble signal, which is an n-frequency divided signal of a wobble clock signal phase-synchronized to the wobble signal, and a rising edge of the phase reference signal.

2. The apparatus of claim 1, wherein the wobble signal is a groove wobble signal.

3. The apparatus of claim 1, wherein the phase reference signal is a land pre-pit signal.

4. An apparatus which detects a phase difference between a phase reference signal and a wobble signal detected from an optical recording medium, comprising:

a wobble PLL unit which outputs a wobble clock signal, which is the result of a phase-locked loop circuit having the wobble signal as an input signal, and a PLL wobble signal which is phase-synchronized to the input wobble signal;

a center detection unit which detects a center of the phase reference signal and generates a center detection signal;

a count hold signal generation unit which generates a count hold signal at a rising edge of the PLL wobble signal that is first generated after the center detection signal of the center detection unit;

a counter which sets a cycle of the phase reference signal from the center detection signal, and down-counts in units of wobble clocks to a point where the count hold signal is generated; and a count latch unit which, by using the count hold signal, latches a count value counted in the counter and maintains the count value until a next hold signal is generated so as to calculate the phase difference between the wobble signal that is to be actually compensated and the phase reference signal.

5. The apparatus of claim 4, wherein the center detection unit detects a rising edge of 1T of the phase reference signal, and delays the detected value for 2 to 3Ts so as to output the center detection signal of the phase reference signal.

6. The apparatus of claim 4, wherein a signal obtained by frequency-dividing the PLL wobble signal is provided as an interrupt signal to a predetermined control unit so that the phase difference is read by the predetermined control unit.

7. The apparatus of claim 4, wherein the wobble signal is a groove wobble signal.

8. The apparatus of claim 4, wherein the phase reference signal is a land pre-pit signal.

9. The apparatus of claim 4, wherein the phase difference between the phase reference signal and the wobble signal is a difference between the rising edge of the PLL wobble signal and a rising edge of the phase reference signal.

10. The apparatus of claim 4, wherein the wobble PLL unit comprises:

a phase detector which outputs the phase difference by comparing the wobble signal with the PLL wobble signal that is an n-frequency divided signal of the wobble clock signal phase-synchronized to the wobble signal;

a low pass filter which low pass filters the phase difference provided from the phase detector;

a voltage-controlled oscillator which outputs a clock oscillation signal corresponding to an output of the low pass filter; and an n-frequency divider which generates the PLL signal by n-frequency dividing the wobble clock signal output from the voltage-controlled oscillator.

11. The apparatus of claim 4, further comprising a frequency divider which frequency divides the count hold signal and outputs a signal to read the phase difference output from the count latch unit.

12. A method of recording/reproducing data with respect to an optical recording medium, the method comprising:

detecting a phase difference between a phase reference signal and a wobble signal detected from the optical recording medium; and compensating for the phase difference where the phase difference is equal to or greater than a predetermined reference values, wherein the detecting of the phase difference comprises detecting a difference between a rising edge of a PLL wobble signal, which is an n-frequency divided signal of a wobble clock signal phase-synchronized to the wobble signal, and a rising edge of the phase reference signal.

13. A method of detecting a phase difference between a phase reference signal and a wobble signal where data is recorded on and reproduced from an optical recording medium, the method comprising:

outputting a wobble clock signal which is the result of a phase-locked loop circuit having the wobble signal as an input signal, and a PLL wobble signal which is phase-synchronized to the wobble signal;

detecting a center of the phase reference signal and generating a center detection signal;

generating a count hold signal at a first rising edge of the PLL wobble signal that is generated for the first time after the center detection signal of the phase reference signal;

setting a cycle of the phase reference signal from the center detection signal, and down-counting in units of wobble clocks to a point where the count hold signal is generated; and by using the hold signal, latching the counted value and maintaining the counted value until a next hold signal is generated so as to output the counted value as the phase difference between the phase reference signal and the wobble signal.

14. The method of claim 13, wherein:

the optical recording medium is one of a DVD-R and a DVD-RW, the phase reference signal is a land pre-pit (LPP) signal, and the detecting of the center of the phase reference signal includes detecting a rising edge of 1T of the LPP signal and delaying the detected value for 2~3Ts so as to output a center detection signal of the LPP signal is output.

15. An apparatus which records and reproduces data with respect to an optical recording medium, comprising a data processing unit which detects a phase difference between a phase reference signal and a wobble signal detected from the optical recording medium, and in response to the detected phase difference being equal to or greater than a predetermined reference value, compensates for the phase difference and performs signal processing to record the data on or reproduce the data from the optical recording medium, the apparatus further comprising:

a pickup unit which reads a signal recorded on the optical recording medium and records data on the optical recording medium;

a high frequency amplifier which amplifies the signal output from the pickup, and outputs a reproduction signal and the wobble signal detected from the signal to the data processing unit; and an adaptive laser power controller which receives a recording pulse signal corresponding to the data from the data processing unit, and controls an amount of a laser used to record the data on the optical recording medium.

16. The apparatus claim 15, further comprising:

a host interface unit which interfaces between the data processing unit and an external host device that provides the data;

a motor and drive unit which drives the optical recording medium;

a servo control unit which controls the motor and drive unit according to a control signal of the data processing unit; and a controller which controls signal interaction of the pickup unit, the high frequency amplifier, the adaptive laser power controller, the host interface unit, the motor and drive unit, and the servo control unit.

* * * * *

UNITED STATES PATENT AND TRADEMARK OFFICE
CERTIFICATE OF CORRECTION

| | |
|---|---|
| PATENT NO. | : 7,046,598 B2 |
| APPLICATION NO. | : 10/369522 |
| DATED | : May 16, 2006 |
| INVENTOR(S) | : Woo-Sik Eom |

It is certified that error appears in the above-identified patent and that said Letters Patent is hereby corrected as shown below:

Column 7, Line 59, change "values," to --value.--

Signed and Sealed this

Ninth Day of January, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,046,598 B2 | Page 1 of 1 |
| APPLICATION NO. | : 10/369522 | |
| DATED | : May 16, 2006 | |
| INVENTOR(S) | : Woo-Sik Eom | |

It is certified that error appears in the above-identified patent and that said Letters Patent is hereby corrected as shown below:

Column 7, Line 59, change "values," to --value,--

This certificate supersedes Certificate of Correction issued January 9, 2007.

Signed and Sealed this

Tenth Day of April, 2007

JON W. DUDAS
*Director of the United States Patent and Trademark Office*